(12) United States Patent
Yue

(10) Patent No.: US 7,448,786 B2
(45) Date of Patent: Nov. 11, 2008

(54) LIGHT GUIDE PLATE AND BACKLIGHT MODULE USING THE SAME

(75) Inventor: Guo-Han Yue, ShenZhen (CN)

(73) Assignees: Hong Fu Jin Precision Industry (Shenzhen) Co., Ltd., Bao-an District, Shenzhen, Guangdong Province (CN); Hon Hai Precision Industry Co, Ltd., Tu-Cheng, Taipei Hsien (TW)

( * ) Notice: Subject to any disclaimer, the term of this patent is extended or adjusted under 35 U.S.C. 154(b) by 53 days.

(21) Appl. No.: 11/499,053

(22) Filed: Aug. 4, 2006

(65) Prior Publication Data

US 2007/0103936 A1    May 10, 2007

(30) Foreign Application Priority Data

Nov. 10, 2005    (CN) .......................... 2005 1 0101186

(51) Int. Cl.
*F21V 7/04* (2006.01)

(52) U.S. Cl. ........................ 362/618; 362/608; 362/613; 362/615

(58) Field of Classification Search ................. 362/615, 362/608, 613, 618
See application file for complete search history.

(56) References Cited

U.S. PATENT DOCUMENTS

| | | | |
|---|---|---|---|
| 2004/0212981 A1* | 10/2004 | Wang et al. | 362/31 |
| 2005/0162866 A1* | 7/2005 | Osawa | 362/612 |
| 2006/0044831 A1* | 3/2006 | Yu | 362/615 |
| 2006/0285356 A1* | 12/2006 | Tseng | 362/608 |

* cited by examiner

*Primary Examiner*—Stephen F. Husar
*Assistant Examiner*—Jessica L McMillan
(74) *Attorney, Agent, or Firm*—Morris, Manning & Martin LLP; Tim Tingkang Xia

(57) ABSTRACT

A backlight module (20) includes a light guide plate (21) and two light emitters (22). The light guide plate includes an emitting surface (212), a bottom surface (213) opposite to the emitting surface, a plurality of side surfaces interconnecting the emitting surface and bottom surface, and an incident surface (211) disposed at a corner portion thereof adjoining to two adjacent side surfaces. The light guide plate defines a through hole (23) in the corner portion adjacent to the incident surface. The two light emitters are adjacent to and face the incident surface.

20 Claims, 4 Drawing Sheets

LIGHT GUIDE PLATE AND BACKLIGHT MODULE USING THE SAME

1. TECHNICAL FIELD

The present invention relates to light guide plates and backlight modules and, particularly, to a light guide plate and a backlight module for use in, e.g., a liquid crystal display (LCD).

2. BACKGROUND

A backlight module is commonly employed to illuminate a liquid crystal display panel in an LCD. In general, backlight modules include a light guide plate and a light source to supply light to the light guide plate. Although tubular fluorescent lamps such as cold cathode fluorescent lamps (CCFLs) have been widely adopted as light sources, a recent tendency in adopting alternative light sources using point light emitters such as light emitting diodes (called LEDs hereafter) are growingly popular. Two or more LEDs are generally provided as a light source in a backlight module so that enough light is generated.

FIG. 1 and FIG. 2 represents a backlight module 10 including the light source and a light guide plate 13. The light guide plate 13 includes an incident surface 131, an emitting surface 132 adjoining to the incident surface 131, and a bottom surface 133 opposite to the emitting surface 132. The light source includes three light emitters 12 such as LEDs. The light emitters 12 are positioned besides the light guide plate 13 and face the incident surface 131. Light rays emitted from the light emitters 12 enter the light guide plate 13 via the incident surface 131, and are reflected and refracted in the light guide plate 13 until finally emitted out of the light guide plate 13 via the emitting surface 132. However, a plurality of dark areas 15 exist on the emitting surface 132 corresponding to positions between any two light emitters 12 because less light rays projects onto these areas. Thus, the backlight module 10 has a low optical uniformity.

What is needed, therefore, is a light guide plate and a backlight module using the same which can improve their optical brightness and optical uniformity.

SUMMARY

A backlight module includes a light guide plate and two light emitters. The light guide plate includes an emitting surface, a bottom surface opposite to the emitting surface, a plurality of side surfaces interconnecting the emitting surface and bottom surface, and an incident surface disposed at a corner portion thereof adjoining to two adjacent side surfaces. The light guide plate defines a through hole in the corner portion adjacent to the incident surface. The two light emitters are adjacent to and face the incident surface.

A light guide plate as above-described according to a preferred embodiment is also provided.

Other advantages and novel features will become more apparent from the following detailed description of preferred embodiments when taken in conjunction with the accompanying drawings.

BRIEF DESCRIPTION OF THE DRAWINGS

Many aspects of the light guide plate and related backlight module having the same can be better understood with reference to the following drawings. The components in the drawings are not necessarily to scale, the emphasis instead being placed upon clearly illustrating the principles of the present the light guide plate and related backlight module. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present backlight module and light guide plate, in detail.

Figure 1:
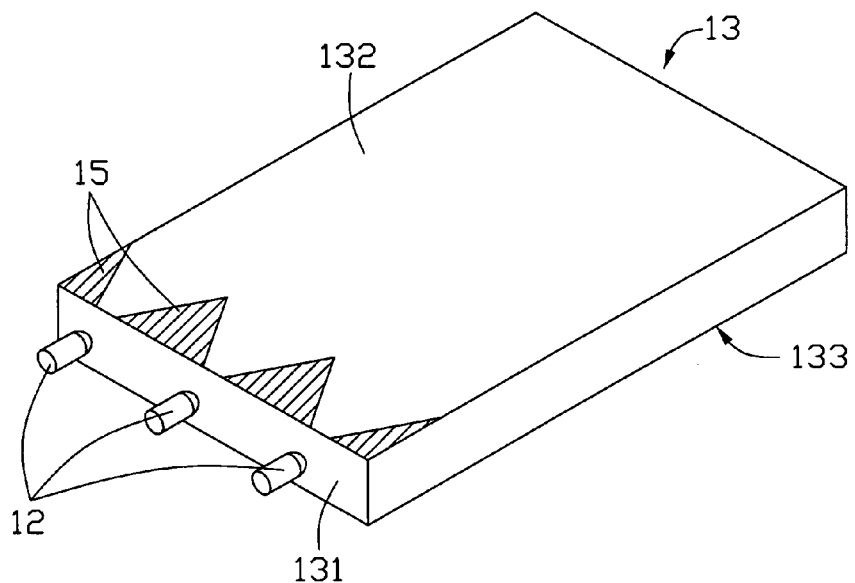
FIG. 1 is a schematic, isometric view of a conventional backlight module.
Figure 2:
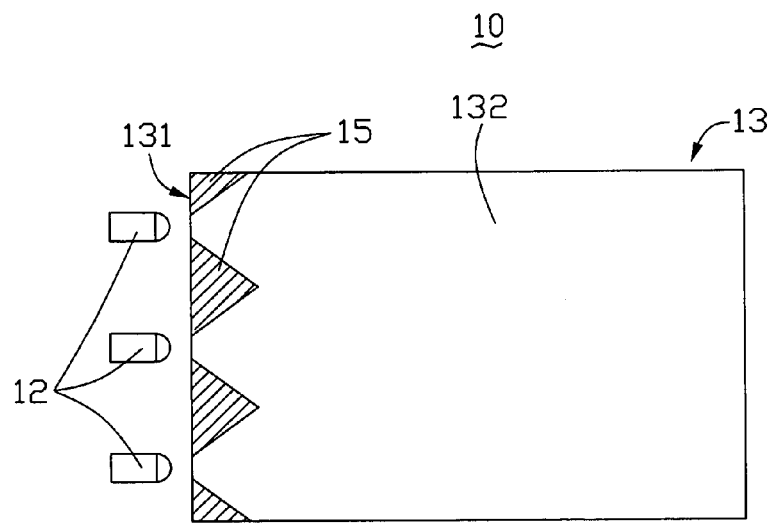
FIG. 2 is a top view of the backlight module of FIG. 1.
Figure 3:
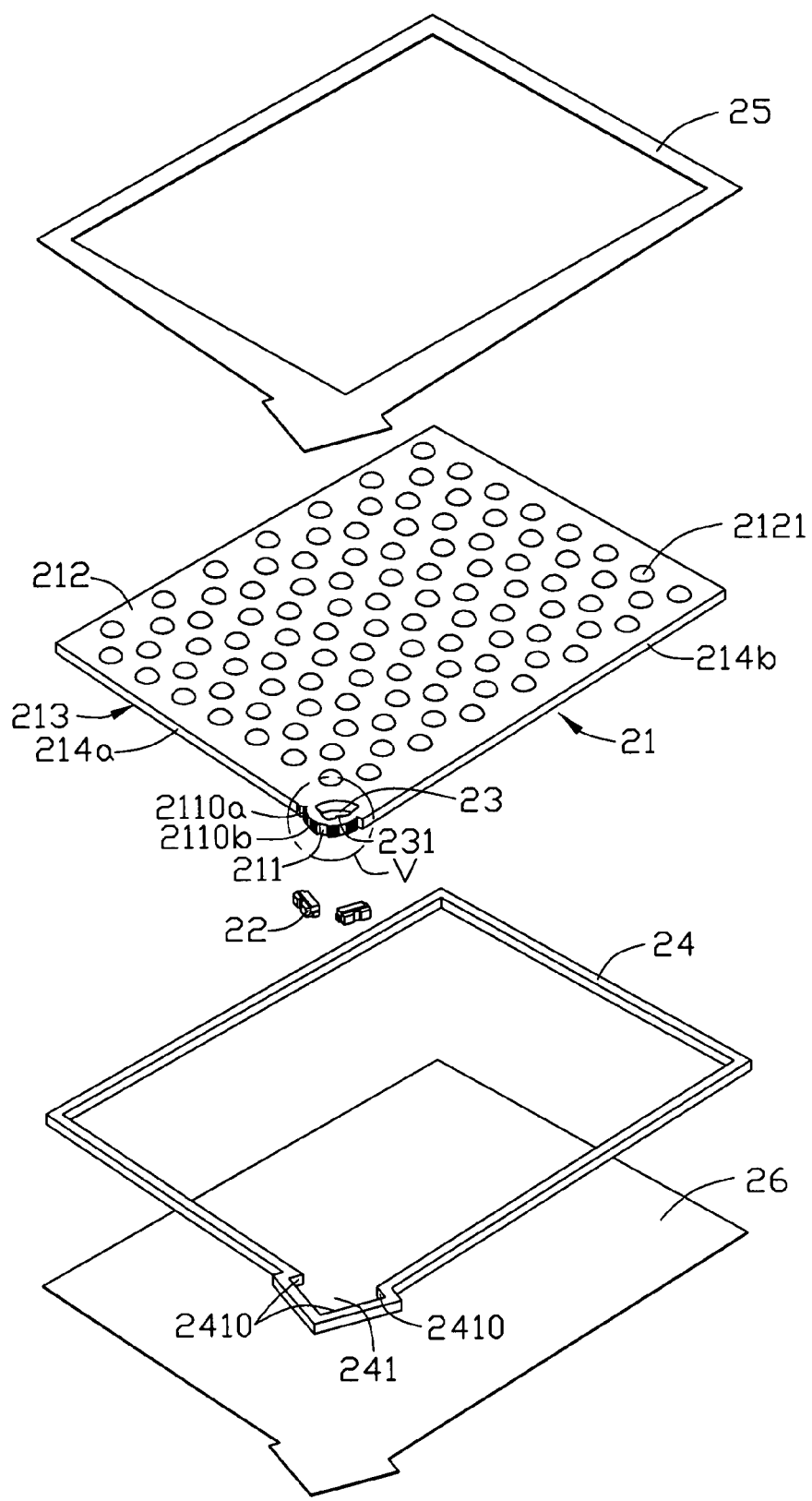
FIG. 3 is schematic, exploded view of a backlight module according to a preferred embodiment.
Figure 4:
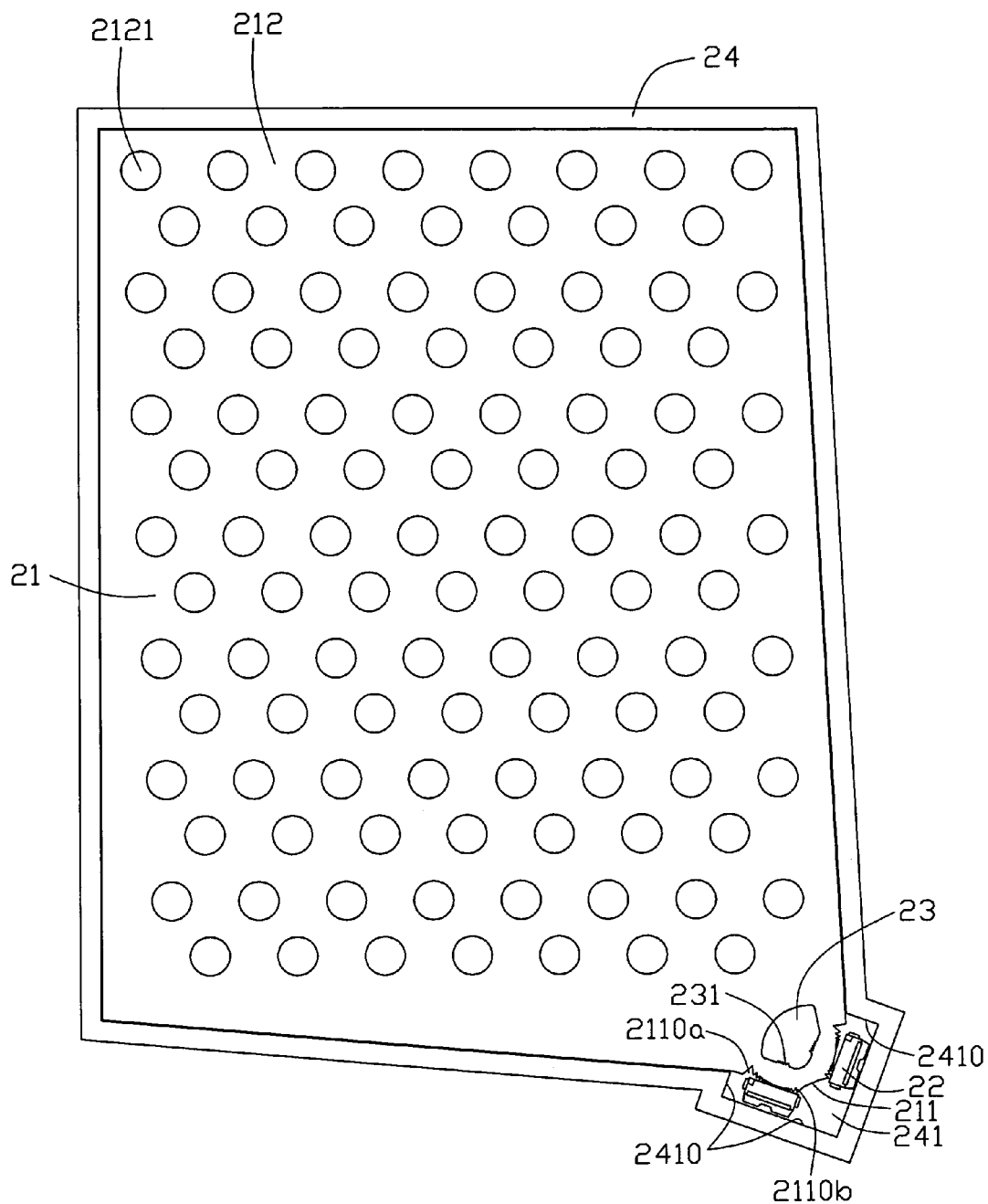
FIG. 4 is a top view of the backlight module of FIG. 3.

Referring to FIG. 3 and FIG. 4, a preferred embodiment backlight module 20 includes a light guide plate 21, two light emitters 22, a frame 24, a shading strip 25, and a reflective sheet 26. The frame 24 is disposed at a periphery of the light guide plate 21. The shading strip 25 is disposed above the light guide plate 21. The reflective sheet 26 is disposed under the light guide plate 21.

The light guide plate 21 includes an incident surface 211, an emitting surface 212 adjoining to the incident surface 211, a bottom surface 213 opposite to the emitting surface 212, and a number of side surfaces interconnecting the emitting surface 212 and the bottom surface 213 including two adjacent side surfaces 214a and 214b. The side surfaces 214a and 214b of the light guide plate 21 cooperatively define a corner portion. The incident surface 211 is a rough surface located at the corner portion of the light guide plate 21. The incident surface 211 has two incident portions. One incident portion is adjacent to the side surface 214a and another incident portion is adjacent to the side surface 214b. The two incident portions respectively face different directions.

Figure 5:
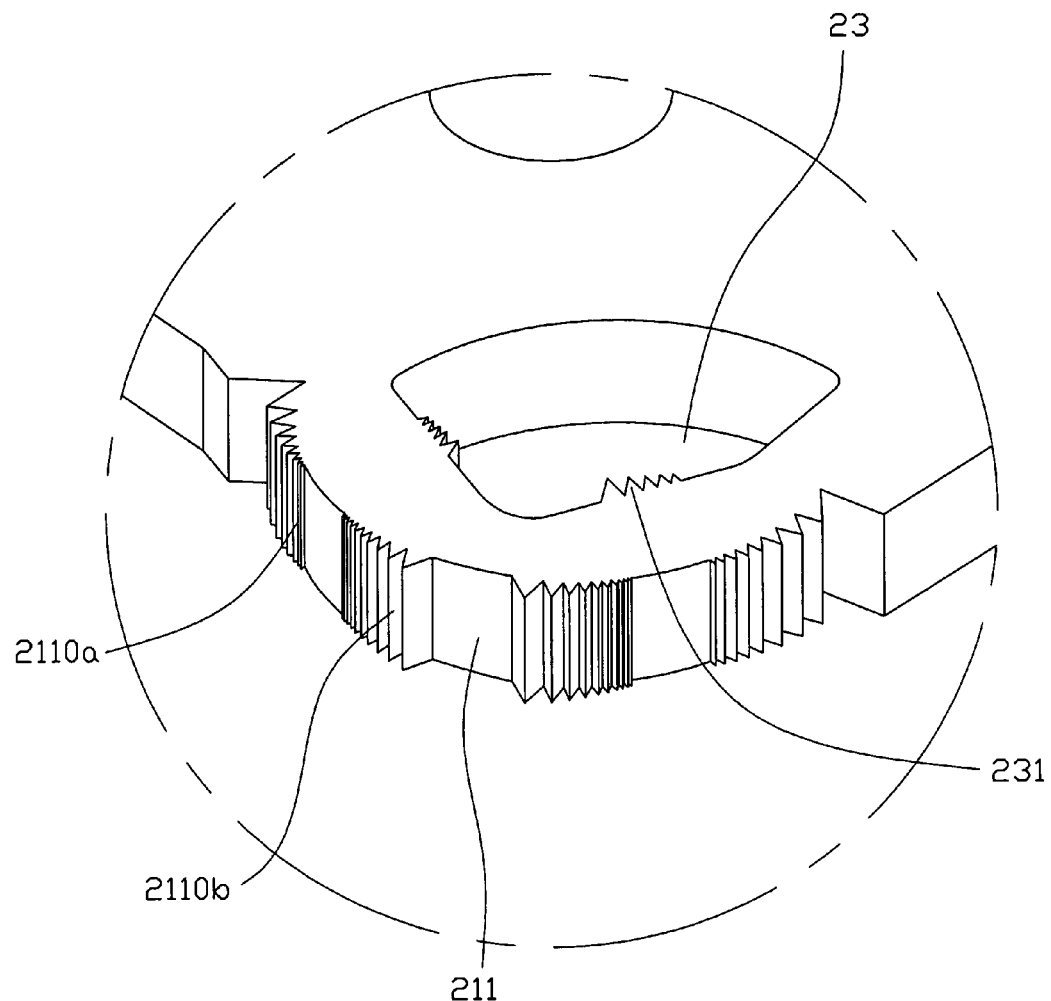
FIG. 5 is an enlarged view of a circled portion V of FIG. 3.

Each incident portion defines a number of V-shaped troughs 2110a adjacent to the side surface 214a or the side surface 214b, and a number of V-shaped troughs 2110b adjacent to a center portion of the incident surface 211. Referring to FIG. 5, the troughs 2110a and troughs 2110b extend between the emitting surface 212 and the bottom surface 213 and each single trough 212 or 213 may take on a different figure. Respective widths of the troughs 2110a progressively increases with decreasing distance from the side surface and respective widths of the troughs 2110b progressively increases with decreasing distance from the center portion of the incident surface 211.

The emitting surface 212 defines a number of dots 2121 for altering emitting directions of light rays refracting out of the emitting surface 212. The dots 2121 may be protrusions or depressions. The light guide plate 21 defines a through hole 23 adjacent to the incident surface 211. A figure of the through hole 23 may take on any shape. An inside wall defining the through hole 23 forms a number of V-shaped protrusions 231. Also referring to FIG. 5, the protrusions 231 are defined adjacent to the incident surface 211 and are positioned corresponding to a position behind an area between the troughs 2110a and 2110b. Respective sizes of the protrusions 231 progressively increases with increasing distance from corresponding position to the trough 2110a. The bottom surface 213 is a smooth surface. The light guide plate 21 is made of transparent resin materials such as polymethyl methacrylate (PMMA) and polycarbonate (PC).

The light emitters 22 are disposed adjacent to and facing the incident surface 211 of the light guide plate 21. Each light emitter 22 corresponds to one of the incident portions of the incident surface 211. The light emitters 22 are respectively disposed at different sides of the light guide plate 21. An angle defined between the different directions is about 90 degrees. The light emitters 22 are LEDs.

The frame 24 defines a receiving space 241 at one corner thereof. The light guide plate 21 and the light emitters 22 are received in the frame 24. The light emitters 22 and the corner portion of the light guide plate 21 defining the incident surface 211 are positioned corresponding to the receiving space 241. The frame 24 has a number of reflective surfaces 2410 at an inside wall defining the receiving space 241. Every two adjacent reflective surfaces 2410 are approximately perpendicular to each other. The reflective surfaces 2410 of the frame 24 surround the light emitters. A number of reflective sheets may be provided to replace the reflective surfaces 2410. The shading strip 25 and the reflective sheet 26 are disposed to prevent light from emitting out from the light guide plate 21 via the side surfaces and the bottom surface 213, so that more light rays are directed to emit out from the emitting surface 212 of the light guide plate 21.

Light rays emitted from the light emitters 22 pass through the incident surface 211 and enter the light guide plate 21. Light rays that project onto the reflective surfaces 2410 are reflected by the reflective surfaces 2410 toward the incident surface 211 to enter the light guide plate 21. The light rays are gathered together by the troughs 2110a and 2110b on the incident surface 211. A high intensity of light rays pass through the hole 23. Light paths of the light rays passing through the hole 23 are changed by the protrusions 231. Thereby, the light rays are diffused so that the light rays are uniformly distributed in the light guide plate 21. Therefore, there are not any dark areas on the emitting surface 212 when the light emits out from the light guide plate 21. Furthermore, a distance exists between the two light emitters 22, thereby heat generated by the light emitters 22 can be dispersed quickly. Therefore, the light emitters 22 may have a longer service.

In alternative embodiment, the V-shaped troughs 2110a and 2110b of the light guide plate 21 may be replaced by other shaped microstructures so long as light rays can be gathered together. The V-shaped protrusions 231 of the light guide plate 21 may also be replaced by other shaped microstructures. The bottom surface 213 of the light guide plate 21 may also be a rough surface having a number of microstructures. More light emitters 22 (such as three or four) may be provided in the backlight module 20.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A backlight module, comprising:
   a light guide plate having:
   an emitting surface;
   a bottom surface opposite to the emitting surface;
   a plurality of side surfaces interconnecting the emitting surface and the bottom surface;
   an incident surface disposed at a corner portion thereof adjoining to two adjacent side surfaces, the incident surface having at least two incident portions, and the incident portions respectively facing different directions, each incident portion defines a plurality of first microstructures adjacent to the corresponding side surfaces and a plurality of second microstructures adjacent to a center portion of the incident surface only; and
   a through hole defined in the corner portion adjacent to the incident surface, a plurality of third microstructures are defined on inside wall of the through hole adjacent to the incident surface, the third microstructures are defined at a side adjacent to the incident surface and are positioned corresponding to a position behind an area between the first microstructures adjacent to the corresponding side surfaces and the second microstructures adjacent to a center portion of the incident surface only; and
   at least two light emitters being disposed adjacent to the incident surface, each of the light emitters positioned corresponding to a respective one of the incident portions and configured for emitting light into the light guide plate via said respective one of the incident portions.

2. The backlight module according to claim 1, further comprising a frame receiving the light guide plate and the two light emitters.

3. The backlight module according to claim 2, wherein the frame defines a receiving space at one corner thereof, the corner portion of the light guide plate and the light emitters are positioned corresponding to the receiving space, the frame having a plurality of reflective surfaces surrounding the light emitters.

4. The backlight module according to claim 1, wherein the first and second microstructures of the incident surface are configured for directing the lights toward the through hole.

5. The backlight module according to claim 4, wherein the third microstructures of the inside wall of the through hole are configured for directing the light into the other portion of the light guide plate.

6. The backlight module according to claim 5, wherein the third microstructures are V-shaped protrusions.

7. The backlight module according to claim 6, wherein respective sizes of the protrusions progressively increase with increasing distance from corresponding position to the troughs adjacent to the incident surface.

8. The backlight module according to claim 4, wherein the first and second microstructures are V-shaped troughs.

9. The backlight module according to claim 8, wherein the at least two incident portions of the incident surface comprises two incident portions, one incident portion is adjacent to one of the side surfaces defining the corner, and another incident portion is adjacent to another one of the side surfaces defining the corner.

10. The backlight module according to claim 9, wherein the light emitters are respectively disposed at different sides of the light guide plate, and an angle defined between the light emitters is about 90 degrees.

11. The backlight module according to claim 9, wherein respective widths of the troughs adjacent to the side surfaces progressively increases with decreasing distance from the side surfaces, and respective widths of the troughs adjacent to a center portion of the incident surface progressively increases with decreasing distance from the center of the incident surface.

12. The backlight module according to claim 1, wherein the light emitters are light emitting diodes.

13. The backlight module according to claim 1, further comprising a reflective sheet disposed under the bottom surface of the light guide plate.

14. A light guide plate comprising:
   an emitting surface;

a bottom surface opposite to the emitting surface;

a plurality of side surfaces interconnecting the emitting surface and bottom surface and including two adjacent side surfaces;

an incident surface disposed at a corner portion thereof adjoining to two adjacent side surfaces, the incident surface having two incident portions, one incident portion be adjacent to one of the side surfaces defining the corner portion, and another incident portion be adjacent to another one of the side surfaces defining the corner portion, two incident portions respectively facing different directions, and each incident portion configured to corresponding to a respective light emitter; and a through hole defined in the corner portion of the light guide plate adjacent to the incident surface.

15. The light guide plate according to claim 14, wherein each incident portion defines a plurality of V-shaped troughs at a position adjacent to the corresponding side surfaces and a plurality of V-shaped troughs at a position adjacent to a center portion of the incident surface only, respective sizes of the troughs adjacent to the corresponding side surfaces progressively increase with decreasing distance from the side surface, and respective sizes of the troughs adjacent to a center portion of the incident surface progressively increase with decreasing distance from the center of the incident surface.

16. The light guide plate according to claim 15, wherein an inside wall defining the hole defines/forms a plurality of protrusions, the protrusions are defined at a side adjacent to the incident surface and are positioned corresponding to a position between the troughs adjacent to the corresponding side surfaces and the troughs adjacent to a center portion of the incident surface only, respective sizes of the protrusions progressively increase with increasing distance from corresponding position to the trough.

17. A backlight module comprising:

a light guide plate including a corner portion and a hole defined within the corner portion;

a plurality of incident portions including first and second incident portions formed along a periphery of the corner portion, the incident portions facing different directions;

a plurality of light emitters including first and second light emitters arranged around the corner portion with each corresponding to one of the incident portions, the light emitters disposed at different sides of the light guide plate, wherein the hole is configured so that lights emitted from the first and second light emitters enter the corner portion through the respective incident portions and then the hole before entering further other portion of the light guide plate.

18. The backlight module of claim 17, wherein the first and second incident portions include microstructures configured for gathering the lights toward the hole.

19. The backlight module of claim 18, wherein an inside wall defining the hole include microstructures configured for diffusing the lights into the other portion of the light guide plate.

20. The backlight module of claim 19, wherein an angle defined by the different directions that the light emitters facing is about 90 degrees.

* * * * *